United States Patent [19]

Olofsson

[11] 4,430,543

[45] Feb. 7, 1984

[54] INDUCTOR FOR INDUCTION WELDING AND A METHOD FOR THE MANUFACTURE OF THE SAME

[75] Inventor: Bo H. O. Olofsson, Kävlinge, Sweden

[73] Assignee: Tetra Pak Developpement SA, Pully-Lausanne, Switzerland

[21] Appl. No.: 371,942

[22] Filed: Apr. 26, 1982

Related U.S. Application Data

[63] Continuation of Ser. No. 125,752, Feb. 28, 1980, abandoned.

[30] Foreign Application Priority Data

Mar. 8, 1979 [SE] Sweden ................................ 7902078

[51] Int. Cl.³ .............................................. H05B 6/42
[52] U.S. Cl. .............................. 219/10.79; 219/10.43; 219/10.49 R; 336/61; 336/232
[58] Field of Search ................... 219/10.79, 10.49 R, 219/10.53, 10.67, 10.43; 336/200, 61, 232

[56] References Cited

U.S. PATENT DOCUMENTS

| 3,505,569 | 4/1970 | Schweizerhof | 336/200 X |
| 3,560,904 | 2/1971 | Wilkes | 336/200 X |
| 3,731,243 | 5/1973 | Davis | 336/61 |
| 3,769,698 | 11/1973 | Lademann et al. | 336/200 X |
| 3,790,735 | 2/1974 | Peters, Jr. | 219/10.79 X |
| 3,843,857 | 10/1974 | Cunningham | 219/10.49 R |
| 3,953,700 | 4/1976 | Sindt | 336/61 X |
| 4,109,128 | 8/1978 | Köhl | 219/10.43 |
| 4,220,839 | 9/1980 | De Leon | 219/10.49 R |
| 4,230,923 | 10/1980 | Jeppsson | 219/10.49 R |

*Primary Examiner*—B. A. Reynolds
*Assistant Examiner*—P. Leung
*Attorney, Agent, or Firm*—Burns, Doane, Swecker & Mathis

[57] ABSTRACT

Inductors for the induction welding of complicated welding patterns have been produced up to now mostly from copper plates which were provided with slits in the desired patterns by spark-cutting and embedded into plastic material. This method of manufacture is expensive and does not allow production of inductors with a very detailed pattern because, among other things, the slits must have a minimum width determined by the spark-cutting. By making the inductors in accordance with the present invention having a thin copper foil which is applied onto the surface of an insulating material, these difficulties are overcome and the desired inductor pattern can be produced in a simple manner by etching with the help of a suitable acid. This makes possible great accuracy of detail so that detailed inductors, e.g. for the packaging industry, can be manufactured at low costs.

10 Claims, 3 Drawing Figures

INDUCTOR FOR INDUCTION WELDING AND A METHOD FOR THE MANUFACTURE OF THE SAME

This application is a continuation of application Ser. No. 125,752, filed Feb. 28, 1980, now abandoned.

BACKGROUND AND SUMMARY OF THE PRESENT INVENTION

This invention relates to induction welding, and more particularly to inductors and a method for making inductors. Induction welding is used, among other things, for welding of the type of laminated material which is used in the packaging industry, that is to say, laminated material comprising layers of thermoplastics and aluminium foil. The technique is well-known and is based on the fact that a magnetic field around a conductor, through which passes an alternating current, is capable of inducing a current into an adjoining conducting material which, owing to the resistance of the material, causes a more or less pronounced heating of the material. In induction welding an induction loop or coil of the same configuration as that which the desired weld is to obtain is placed close to the laminate containing an aluminium foil, whereupon the laminate is pressed together with the material to which it is to be joined. The aluminium foil will now be heated in a pattern corresponding to the configuration of the coil and by appropriately selecting current, frequency and duration of the process, the material can be heated to the desired temperature, that is to say, a temperature which is sufficiently high for the layers of thermoplastic material adjoining one another to melt together.

In the packaging industry it is customary to use induction welding for the welding together of packages which are produced from laminated material comprising aluminium foil and thermoplastics. Induction welding is also used for the attachment by welding of sealing washers of aluminium foil and thermoplastics in caps, lids and the like.

The inductors used up to now for the welding of complicated welding patterns in the packaging industry consisted of a copper plate of 5–10 mm thickness, in which by spark-cutting, slits have been produced in such a pattern that the remaining parts of the plate form an induction coil of the desired configuration. The spark-cut plate is subsequently applied to a base of insulating material providing mechanical stiffness and embedded into plastic material in such a manner that the slits obtained by the spark-machining are wholly filled with the plastics serving as an insulating material. Then the side of the plate which is to serve as working surface is ground to accurate planeness and covered with a thin layer of insulating material, e.g. tetrafluoroethylene. This type of inductor is complicated and expensive to manufacture, and it is also difficult to produce with good precision, since the spark-machining needs a certain amount of space and, among other things, precludes the cutting of slits of a width less than approx 0.2 mm. The inductors moreover are relatively cumbersome and cannot therefore be used in the welding of small details, especially if the available space is limited. The welding in a detailed pattern is also rendered difficult in that the magnetic field, owing to the relatively large cross-sectional area of the induction coil, will be undefined and not suitable for welding in narrow, linear areas. Finally, the large cross-sectional area of the induction coil entails a further disadvantage from a point of view of energy, since the magnetic field generated will be relatively long, so that the greater part of the magnetic field, that is to say, the non-utilizable part of the magnetic field will be situated inside the inductor, which appreciably diminishes the efficiency of the inductor.

For the above reasons it is generally felt desirable in the packaging industry that an inductor should be provided, suitable for the induction welding of laminated material, especially for the welding of small details in a complicated welding pattern.

It is an object of the present invention to provide an inductor of this type which is not subject to the disadvantages of the earlier known arrangements.

It is a further object of the present invention to provide an inductor whose induction coil can furnish with good precision a desired pattern rich in detail.

It is a further object of the present invention to provide an inductor which furnishes a magnetic field concentrated onto the working surface and which consequently has a high efficiency.

It is a further object of the present invention to provide an inductor which can be manufactured with great accuracy and with slits of a width of less than 0.2 mm.

It is a further object of the present invention to provide an inductor which in an inexpensive manner can be manufactured with the help of known technology and which is particularly suitable for production in large numbers.

These and other objects have been achieved in accordance with the present invention in that a method for the manufacture of an inductor and an inductor for induction welding have been given the characteristic that a base of an electrically insulating material is covered with an electrically conducting material. In a preferred embodiment, the base is covered with an electrically conducting foil which foil is subsequently provided with slits which jointly define an induction coil of the desired shape in the foil.

BRIEF DESCRIPTION OF THE DRAWINGS

A preferred embodiment of the inductor and the method of manufacturing the same will now be described in detail with special reference to the attached schematic drawings wherein like members bear like reference numerals and wherein.

DETAILED DESCRIPTION OF THE PREFERRED EMBODIMENTS

Figure 1:
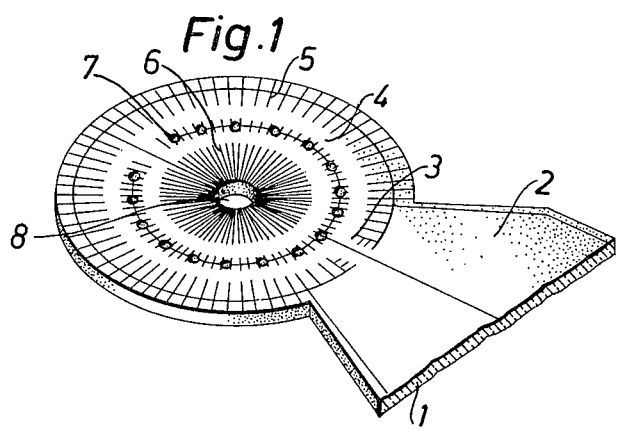
FIG. 1 is a perspective view of an inductor in accordance with the invention which inductor is intended in particular for the attachment by welding of washers or so-called wafers of laminated material to the inside of caps or lids.

The embodiment of an inductor in accordance with the invention (FIG. 1) comprises a base or plate 1 of an electrically insulating material, preferably glass fibre, which is suitable also from a point of view of strength. One surface of the plate 1 is plane and is covered with a foil of an electrically conducting material, which foil may have a thickness between 0.025 and 0.300 mm. Preferably, however, a copper foil of a thickness of 0.105 mm is used. In the foil a pattern of slits 3 is present, which slits form on the circular working surface proper of the inductor a pattern of a substantially circular double induction coil 4. The induction coil 4 is surrounded on its inside as well as on its outside with a large number of cooling ribs 5 and 6 respectively. The cooling ribs 5, 6 are in the form of a large number of tongues extending sideways from the induction coil 4. The cooling ribs, like the induction coil 4, consist of copper foil 2 and are manufactured in one piece with the induction coil. The cooling ribs are mutually separated from one another by the slits 3, which are filled with an electrically insulating material.

The slits 3, which define the induction coil 4 as well as the cooling ribs 5, 6 extend transversely through the copper foil and have a width of 0.05 and 0.30 mm. The slits are filled with an electrically insulating material, whose top surface is in one plane with the top surface of the copper foil. The working surface of the inductor is wholly covered with a thin layer of mechanically wear-resistant insulating material, preferably tetrafluoroethylene. The two ends of the induction coil 4 are joined electrically to a projecting part extending from the circular inductor proper, on which the foil 2 is divided by means of a central slit of the same type as the slits described earlier into two conductors which are connected to a suitable source of current, not shown on the drawing.

The embodiment of the inductor in accordance with the invention which is shown in FIG. 1 is provided lastly with a number of through-holes 7, which are arranged between the conductors of the double induction coil 4, and with a centrally situated hole 8. The holes 7 and 8 are connected to a vacuum source and adapted so as to maintain the foil which is to be attached by welding in contact with the working surface of the inductor before the pressing together of the foil and the cap to which it is to be welded.

Figure 2:
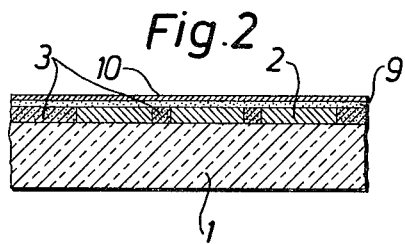
FIG. 2 is, in a larger scale, a section through a preferred embodiment of an inductor in accordance with the invention.

In FIG. 2, which is an enlarged cross-section through a preferred embodiment of the inductor, the different material layers constituting the inductor can be clearly distinguished. At the bottom in the figure is the relatively large plate 1 of glass fibre which in practice has a thickness of 1-3 mm. Above this is a copper foil or copper layer 2 which has a thickness of 0.120 mm and which is broken up by a number of slits 3 which have a width of preferably 0.15 mm and which are wholly filled with an electrically insulating filler material. Above the copper layer 2 provided with slits is a thin layer 9 of adhesive agent, e.g. glue, by means of which the protecting and insulating topmost layer 10 of tetrafluoroethylene is attached to the layer underneath.

Figure 3:
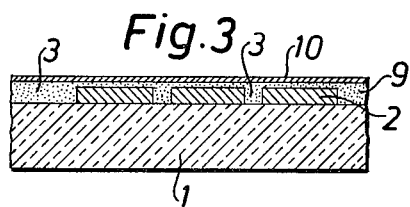
FIG. 3 is, in a larger scale, a section through a second embodiment of an inductor in accordance with the invention.

FIG. 3 corresponds to FIG. 2 but shows a section through a second embodiment of the inductor in accordance with the invention. From FIG. 2, the inductor comprises the layer 1 of glass fibre, the layer 10 of tetrafluoroethylene and the copper foil 2 provided with slits situated in between. In contrast to the embodiment of FIG. 2, however, no special filler material is used for filling out the slits 3 present in the copper foil 2. Instead the glue layer 9 is allowed to penetrate into the slits in the copper foil. The embodiment has proved to be somewhat simpler to manufacture, but the absence of a special filler material in the slits 3 can in some cases make the working surface of the inductor uneven, that is to say, the working surface will have slight indentations or grooves in the same pattern as the underlying slits. In most cases, however, this will be of no importance.

The inductor in accordance with the invention differs from the types of inductors known previously in that the induction coil is in the form of a thin, electrically conducting layer, which is situated on the surface of the insulating base material or plate 1. As a result the magnetic field created around the induction coil will be very "shallow" and extend to almost 50% upwards above the working surface of the inductor defined by the tetrafluoroethylene layer 10 which means that losses will be slight and the inductor will possess a high efficiency. However, the thin foil layer 2 is not capable of dissipating the heat transmitted from the work-piece as effectively as the appreciably thicker induction coils present in earlier devices but this has been compensated in the preferred embodiment in FIG. 1 by providing the induction coil 4 with the tongue-shaped cooling ribs 5 and 6 whose sole function is to improve the heat dissipation. Providing such cooling ribs in an effective manner has proved difficult up to now, since no sufficiently accurate method of manufacture had been available.

The inductor in accordance with the invention can be manufactured in a very rational and accurate manner as will now be described. A plane surface of a plate of electrically insulating material, e.g. the preferred glass-fibre material mentioned earlier, is covered on its plane side with a wholly continuous layer of copper foil which is attached to the plate by glueing or in some other suitable manner. Subsequently, the foil is provided with the slits which define the induction coil as well as possible cooling ribs or other details so that an induction coil of the desired shape is obtained, both ends of this coil being connectable to a source of current. In the mechanical production of individual inductors the slits can be produced with the help of a number of known machining methods, but in industrial production it has proved appropriate to obtain the slits by etching the copper material with a suitable acid.

In industrial manufacture the starting point is thus a photographic image of a pattern in the shape of the desired induction coil, which image is applied to the side of the plate which is covered with the copper foil. The plate has been covered in advance with the copper foil, as has been described earlier. The copper foil in turn is then covered with a thin film of a photosensitive material of the type well-known to those versed in the art and as used e.g. in the manufacture of printed circuit boards. After application of the photographic image in such a manner that the same is placed accurately against the photo-sensitive layer present on the copper surface, the unit is exposed e.g. to ultra-violet light and is developed so that the portions of the photo-sensitive film determined by the image pattern are removed. Subsequently, the copper layer, which is partly protected by the photo-sensitive material, is subjected to an acid which etches away the unprotected portions of the copper layer so that slits in the desired pattern are produced. Finally, the slits are filled with the insulating filler material or alternatively the glue, whereupon the tetrafluoroethylene layer is glued on.

The vacuum holes 7, 8 which may have to be provided in the finished inductor can be drilled in any suitable manner in a pattern adapted to the shape of the induction coil. When the inductor in accordance with the invention is to be used, it is suitably applied to a mandrel situated at the back wherein ducts are provided to be joined to the said vacuum holes 7, 8, so that a washer or foil transferred to the working surface of the inductor can be maintained in contact with the working surface by means of the vacuum until the foil has been pressed against the workpiece to which it is to be attached by welding.

By using the said etching method for the manufacture of the slits 3 which define and form the induction coil as well as any cooling ribs, it becomes possible to produce slits or a width as small as 0.05 mm. In this way even a very detailed pattern can be achieved without a correspondingly increased effort in labour, so that complicated inductors can be produced at a particularly low price. The cost of an inductor manufactured in accordance with the method according to the invention has been found to be 1% less than the cost of an inductor for the same range of application made in the conventional manner. The disadvantage from a point of view of heat dissipation, inherent in the thin induction coil compared with previous induction coils with an appreciably larger cross-sectional area, can be compensated without any appreciable increase in the cost of manufacture by the provision of cooling ribs.

In applications where the aluminium foil which is to be welded onto another material is covered with an insulating layer on the side facing the inductor, the protective layer of tetrafluoroethylene on the inductor may be omitted. This layer is very thin, however, and does not appreciably increase the distance between the induction coil and the copper foil, so that in practice it does not represent any serious disadvantage.

The principles and preferred embodiments of the present invention have been described in the foregoing specification. However, the invention which is intended to be protected is not to be construed as limited to the particular embodiments disclosed. It will be apparent to those skilled in the art that numerous modifications, variations, substitutions, and equivalents exist for features of the invention described herein, which do not materially depart from the scope of this invention. The embodiments disclosed are to be regarded as illustrative rather than restrictive. Accordingly, it is expressly intended that all such modifications, variations, substitutions, and equivalents which fall within the spirit and the scope of the invention as defined in the claims be embraced thereby.

I claim:

1. An inductor for induction welding comprising a base of an electrically insulating material having a surface, an induction coil of an electrically conducting material, said electrically conducting material being a thin, planar copper foil, said foil being laminated to the surface, said induction coil being defined by ends of a plurality of slits extending completely through the copper foil, at least a portion of said plurality of slits extending to an edge of the foil and defining cooling tongues between adjacent slits, said tongues extending in the plane of the foil.

2. An inductor in accordance with claim 1, wherein the base is a plate of glass-fibre material.

3. An inductor in accordance with claim 1 wherein, the slits are filled with an insulating material.

4. The inductor of claim 1 wherein the foil has a thickness between 0.025–0.300 mm.

5. The inductor of claim 3 wherein each of the plurality of slits has a width between 0.05–0.30 mm.

6. The inductor of claim 1, further comprising a protective layer of an electrically insulating material arranged to cover the induction coil.

7. The inductor of claim 6, wherein the protective layer is tetrafluroethylene.

8. The inductor of claim 6, wherein the protective layer is secured to the induction coil by glue, the glue also being the insulating material filling each of the slits.

9. The inductor of claim 1, wherein the plurality of slits is arranged to form a substantially circular double induction coil.

10. The inductor of claim 9, further comprising a plurality of holes arranged between conductors of the double induction coil.

* * * * *